United States Patent
Li et al.

(10) Patent No.: US 12,267,713 B2
(45) Date of Patent: Apr. 1, 2025

(54) SCALING FACTOR FOR NEW RADIO GAP BASED MEASUREMENT

(71) Applicant: Apple Inc., Cupertino, CA (US)

(72) Inventors: Qiming Li, Beijing (CN); Jie Cui, San Jose, CA (US); Rui Huang, Beijing (CN); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/472,846

(22) Filed: Sep. 22, 2023

(65) Prior Publication Data

US 2024/0022935 A1 Jan. 18, 2024

Related U.S. Application Data

(62) Division of application No. 17/280,618, filed as application No. PCT/US2019/053380 on Sep. 27, 2019.

(60) Provisional application No. 62/739,037, filed on Sep. 28, 2018.

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 9,532,251 | B2 | 12/2016 | Awoniyi et al. |
| 2013/0148527 | A1 | 6/2013 | Awoniyi et al. |
| 2013/0301451 | A1* | 11/2013 | Siomina ............... H04B 17/336 370/252 |
| 2014/0302865 | A1 | 10/2014 | Bai et al. |
| 2016/0142926 | A1 | 5/2016 | Yiu et al. |
| 2016/0269919 | A1 | 9/2016 | Kazmi et al. |
| 2016/0337916 | A1 | 11/2016 | Deenoo et al. |
| 2017/0208588 | A1 | 7/2017 | Park et al. |
| 2017/0215133 | A1 | 7/2017 | Yang et al. |

(Continued)

FOREIGN PATENT DOCUMENTS

| | | |
|---|---|---|
| CN | 104012144 A | 8/2014 |
| CN | 104094629 A | 10/2014 |

(Continued)

OTHER PUBLICATIONS

Huawei et al., "Discussion on inter-frequency SMTC overlapping," 3rd Generation Partnership Project (3GPP) TSG-RAN WG4 Meeting #86bis, vol. RAN WG4, No., R4-1804479, Apr. 15, 2018, 4 pages. (Year: 2018).*

(Continued)

*Primary Examiner* — Saad Khawar
(74) *Attorney, Agent, or Firm* — Sterne, Kessler, Goldstein & Fox P.L.L.C.

(57) ABSTRACT

Systems and methods are described for configuring cell identification requirements for a user equipment (UE). The systems and methods can include at least determining a number of measurement objects (MOs) that collide with a target MO for the UE, determining a scaling factor to be used for an inter-frequency cell identification requirement, and transmitting to the UE an indication of the scaling factor.

20 Claims, 11 Drawing Sheets

(56) References Cited

U.S. PATENT DOCUMENTS

| | | | |
|---|---|---|---|
| 2018/0206138 | A1 | 7/2018 | Hayashi et al. |
| 2019/0223216 | A1 | 7/2019 | Siomina |
| 2019/0306734 | A1 | 10/2019 | Huang et al. |
| 2020/0112978 | A1 | 4/2020 | Zhang et al. |
| 2021/0014751 | A1 | 1/2021 | Callender et al. |
| 2021/0352588 | A1 | 11/2021 | Liu et al. |
| 2022/0046442 | A1 | 2/2022 | Li et al. |

FOREIGN PATENT DOCUMENTS

| | | |
|---|---|---|
| CN | 104581754 A | 4/2015 |
| CN | 106664280 A | 5/2017 |
| CN | 107637120 A | 1/2018 |
| CN | 107710806 A | 2/2018 |
| CN | 110419241 A | 11/2019 |
| WO | WO 2013/059999 A1 | 5/2013 |
| WO | WO 2016/164782 A1 | 10/2016 |
| WO | WO 2017/212326 A1 | 12/2017 |
| WO | WO 2018/169829 A1 | 9/2018 |

OTHER PUBLICATIONS

Huawei et al., "Discussion on open issues for SSB based inter-frequency measurement requirements in NR," 3rd Generation Partnership Project (3GPP) TSG-RAN WG4 Meeting #AH-1807, vol. RAN WG4, No., R4-1809042, Jun. 25, 2018, 6 pages. (Year: 2018).*

Patent Search Report dated Nov. 7, 2023, from Chinese Patent Appl. No. 2019800629423, 8 pages with English translation.

International Search Report and Written Opinion of the International Searching Authority directed to related International Patent Application No. PCT/US2019/053380, mailed Nov. 28, 2019; 9 pages.

Intel Corporation, 'On cell identification and measurement delay for inter-frequency measurement', R4-1809885, 3GPP TSG-WG4 RAN#88, Gothenburg, Sweden, Aug. 10, 2018; See sections 2-3.

NTT DOCOMO, Inc., 'Remaining issues on requirements of inter-frequency measurement', R4-1810498, 3GPP TSG RAN WG4 Meeting #88, Gothenburg, Sweden, Aug. 10, 2018; See section 2.

Nokia et al., 'Further discussion on inter-frequency measurement requirements', R4-1810597, 3GPP TSG-WG4 RAN#88, Gothenburg, Sweden, Aug. 10, 2018; See sections 2-3.

Huawei et al., 'CR on TS38.133 for SSB-based inter-frequency measurements', R4-1810682, 3GPP TSG-WG4 RAN#88, Gothenburg, Sweden, Aug. 10, 2018; See sections 9.3.4-9.3.5.

3GPP TSG-RAN WG4; Huawei, "Discussion on SSB based inter-frequency measurement requirements" (Meeting No. 86), R4-1802637, Agenda No. 7.9.4.2.; Feb. 26-Mar. 2, 2018; 3 pages.

3GPP TSG-RAN WG4; Ericsson, "Further aspects of measurement gap design for NR with multiple layers" (Meeting No. 86), R4-1802088, Agenda No. 7.9.4.2.; Feb. 26-Mar. 2, 2018; 3 pages.

3GPP TSG-RAN WG4; Intel Corporation, "On core requirements for intra-frequency and inter-frequency measurements with gap" (Meeting No. 87), R4-1806349, Agenda No. 7.9.4.1.2.; May 21-May 25, 2018; 6 pages.

Extended European Search Report for Application No. 22197577.4 mailed Jan. 12, 2023, 12 pages.

Huawei et al., "Discussion on open issues for SSB based inter-frequency measurement requirements in NR," 3rd Generation Partnership Project (3GPP) TSG-RAN WG4 Meeting #AH-1807, vol. RAN WG4, No., R4-1809042, Jun. 25, 2018, 6 pages.

Huawei et al., "Discussion on inter-frequency SMTC overlapping," 3rd Generation Partnership Project (3GPP) TSG-RAN WG4 Meeting #86bis, vol. RAN WG4, No., R4-1804479, Apr. 15, 2018, 4 pages.

3GPP TSG-RAN WG4; Ericsson, "Further aspects of measurement gap design for NR: Multiple layers," (Meeting No. 87), R4-1806234, Agenda Item: 7.10.3.1, Busan, Korea, May 21-25, 2018, 3 pages.

Li, Wanchao, "The Network Optimization Methods Research of TD-LTE Base Station," Information Science and Technology, China Academic Journal Electronic Publishing House, 87 pages.

Liu, Jin et al., "Initial Access, Mobility, and User-Centric Multi-Beam Operation in 5G New Radio," Key Technologies for 5G New Radio, IEEE Communications Magazine, Mar. 2018, 7 pages.

Ericsson, "Further aspects of measurement gap design for NR. Multiple layers," 3rd Generation Partnership Project (3GPP) TSG-RAN WG4 Meeting #86bis, R4-103787, Mar. 20, 2018; 13 pages.

Huawei et al., "Discussion on inter-frequency SMTC overlapping," 3rd Generation Partnership Project (3GPP) TSG-RAN WG4 Meeting #86bis, vol. RAN WG4, No., R4-1804779, Apr. 15, 2018, 4 pages.

Intel Corporation, "On core requirements for intra-frequency and inter-frequency measurement with gap," 3GPP TSG-RAN WG4 Meeting #87, Busan, KR, May 21-25, 2018, R4-1806350; 6 pages.

Intel Corporation, "On SSB based intra-frequency cell identification and measurement requirement without gap," 3GPP TSG-RAN WG4 Meeting #87, Busan, KR, May 21-25, 2018, R4-1806349; 4 pages.

Extended European Search Report directed to related European Application No. 19867078.8, mailed Nov. 7, 2022; 13 pages.

* cited by examiner

SCALING FACTOR FOR NEW RADIO GAP BASED MEASUREMENT

CROSS REFERENCE TO RELATED APPLICATION

The present application is a divisional of U.S. patent application Ser. No. 17/280,618, filed Mar. 26, 2021, which is a U.S. National Phase of International Application No. PCT/US2019/053380, filed on Sep. 27, 2019, which claims benefit of U.S. Provisional Patent Application No. 62/739,037, filed Sep. 28, 2018, and entitled "On Scaling Factor for New Radio Gap Based Measurement, all of which are hereby incorporated by reference herein in their entireties.

FIELD

Embodiments of the present invention relate generally to the technical field of wireless communications.

BACKGROUND

In 5th Generation (5G) or New Radio (NR) wireless systems, synchronization signals may be transmitted in a synchronization signal block (SSB). The SSB may include primary synchronization signals (PSS), secondary synchronization signals, and a physical broadcast channel (PBCH), which may include a demodulation reference signal or data. A user equipment (UE) may be configured to perform various measurements based on the SSB. These measurements may support cell selection or reselection, handover, radio link monitoring, etc.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
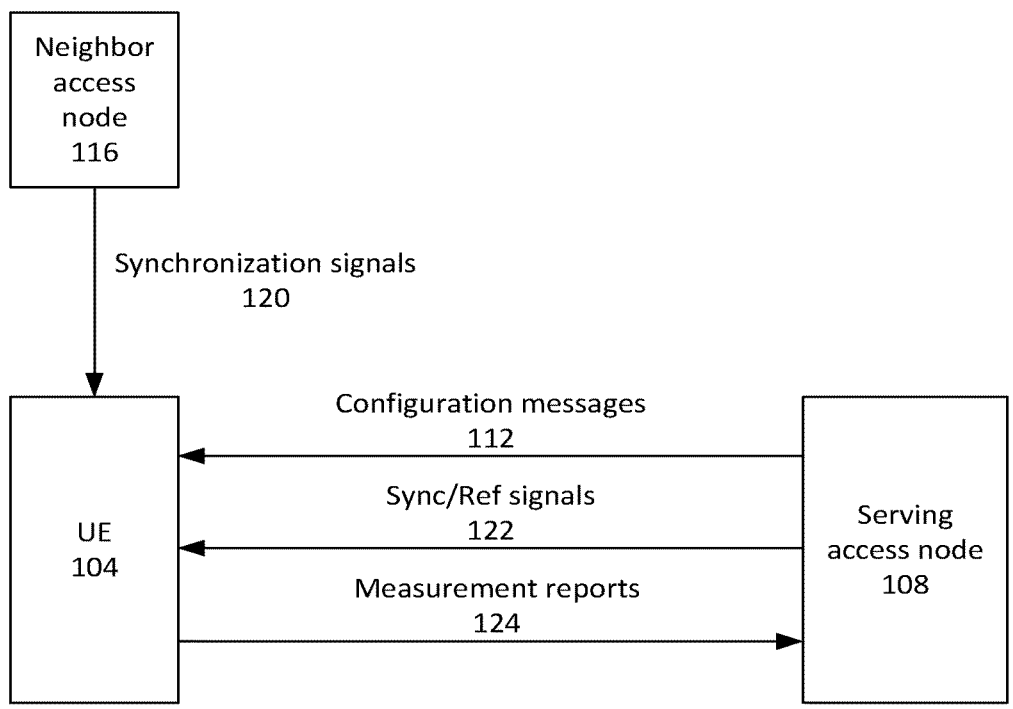
FIG. 1 illustrates a message flow between network devices in accordance with some embodiments.

FIG. 1 illustrates components of a network 100 to describe operations in connection with measurement configuration and reporting in accordance with some embodiments. Briefly, the network 100 may include a UE 104 communicatively coupled with a serving access node 108. The serving access node 108 may provide configuration information in one or more configuration messages 112. The configuration information may configure measurements for the UE 104 to perform. In some embodiments, the configuration information may provide information related to measurement gaps (MGs) or measurement objects (MOs) associated with synchronization-signal block (SSB)-based measurement timing configurations (SMTCs).

The UE 104 may perform measurements on signals transmitted by the serving access node 108 or a neighbor access node 116. In some embodiments, the neighbor access node 116 may transmit synchronization signals 120 that the UE 104 may measure to identify a cell provided by the neighbor access node 116. In some embodiments, the serving access node 108 may transmit synchronization/reference signals 122 that the UE 104 may measure to provide the serving access node 108 with information on a quality of a connection with a cell provided by the serving access node 108. The synchronization/reference signals 122 may include SSBs.

The UE 104 may transmit measurement reports 124 with the results of the measurements to the serving access node 108. The serving access node 108 may use the results to manage one or more connections for the UE 104.

The serving access node 108 and the neighbor access node 116 may provide one or more LTE or NR cells. In some embodiments, the NR cells may be in an NR first frequency range (FR1), which may correspond to a frequency range from 450 MHz-6000 MHz, or an NR second frequency range 2 (FR2), which may correspond to a frequency range from 24,250 MHz-52,600 MHz.

In some embodiments, the measurements performed by the UE 104 may be based on SSBs transmitted by the serving access node 108 or the neighbor access node 116. The measurements may be inter-frequency measurements or intra-frequency measurements.

An intra-frequency measurement may be performed by the UE 104 in the event that it is configured to measure synchronization signals 120 transmitted by the neighbor access node 116 in the same frequency range as that used for communicating with the serving access node 108.

An inter-frequency measurement may be performed by the UE 104 in the event that it is configured to measure synchronization signals 120 transmitted by the neighbor access node 116 in a different frequency range as that used for communicating with the serving access node 108.

In some embodiments, the UE 104 may be configured with information to determine intra-or inter-frequency cell identification requirements. These requirements may include a time period within which the UE is expected to identify a detectable intra-or inter-frequency cell. These requirements may be based on certain operating parameters, for example, whether the identification is performed with or without discontinuous reception (DRX), whether a cell is known or unknown, etc.

The serving access node 108 may configure UEs within its cell(s) with a measurement gap and may also include a number of MOs with different SMTCs. Compared to LTE gap based measurements, NR gap based measurements may be more complex as different MOs may include different SMTC periods and an SMTC period may or may not be fully overlapped with a measurement gap repetition period (MGRP).

Consider, for example, a scenario that attempts to address measurement requirements for multiple layers within a single framework. This scenario may include two MOs (MO1 and MO2) configured with different SMTC periods and partial overlap. MO1 may fully overlap with an MG and MO2 may partially overlap (for example, overlap on every other MG occurrence). The following parameters may apply.

TABLE 1

| | MO1 | MO2 |
|---|---|---|
| G/MGRP | 2 | 2 |
| $\lambda_{i,j}$ | 1, j = 0    1, j = 1 | 1, j = 0    0, j = 1 |
| $\theta_j$ | 2, j = 0; 1, j = 1 | 2, j = 0; 1, j = 1 |
| $\theta$ | 3 | 2 |
| $\varepsilon_{i,j}$ | 1/3, j = 0; 1/3, j = 1 | 1/2, j = 0; 0 |
| $\Delta_i = \sum_{j=0}^{\left(\frac{G}{MGRP}\right)-1} \lambda_{i,j}$ | 2 | 1 |
| $\sum_{j=0}^{(G/MGRP)-1} \varepsilon_{i,j}$ | 2/3 | 1/2 |
| Scaling factor | 3 | 2 |
| Measurement delay | 3 * K * SMTC1 | 2 * K * SMTC2 = 4 * SMTC1 |

In this situation, the delay requirements for MO1 may be unnecessarily loose regardless of a measurement order. Depending on the typical measurement order, the corresponding measurement delay may be as follows:

TABLE 2

| Measurement delay | MO1 | MO2 |
|---|---|---|
| MO1 equally shares the collided MG with MO2 | 2/1.5*K*SMTC1 = 4/3*K*SMTC1 | 2*K*SMTC2 = 4*SMTC1 |
| Collided MG is used by MO2 only | 2*K*SMTC1 | K*SMTC2 = 2*K*SMTC1 |

In another scenario, three MOs may be configured with different SMTC periods and partial overlap. For example, MO1 may be configured to be completely overlapped with the MG, while MO2 and M3 are both configured to partially overlap with MG/MO1 (for example, overlap on every other MG occurrence). In this scenario, and assuming equal splitting, the following may apply.

TABLE 3

| | MO1 | MO2 | MO3 |
|---|---|---|---|
| G/MGRP | 2 | 2 | 2 |
| $\lambda_{i,j}$ | 1, j = 0   1, j = 1 | 1, j = 0   0, j = 1 | 1, 0 |
| $\theta_j$ | 3, j = 0; 1, j = 1 | 3, j = 0; 1, j = 1 | 3, j = 0; 1, j = 1 |
| $\theta$ | 4 | 3 | 3 |
| $\varepsilon_{i,j}$ | 1/4, j = 0; 1/4, j = 1 | 1/3, j = 0; 0, j = 1 | 1/3, j = 0; 0, j = 1 |
| $\Delta_i = \sum_{j=0}^{\left(\frac{G}{MGRP}\right)-1} \lambda_{i,j}$ | 2 | 1 | 1 |
| $\sum_{j=0}^{(G/MGRP)-1} \varepsilon_{i,j}$ | 1/2 | 1/3 | 1/3 |
| Scaling factor | 4 | 3 | 3 |
| Measurement delay | 4 * K * SMTC1 | 3 * K * SMTC2 = 6 * SMTC1 | 3 * K * SMTC2 = 6 * SMTC1 |

The delay requirements for MO1 in this scenario is also unnecessarily loose regardless of measurement order. Depending on a typical measurement order, the corresponding measurement delay may be:

TABLE 4

| Measurement delay | MO1 | MO2 | MO3 |
|---|---|---|---|
| MO1 equally shares the collided MG with MO2/3 | 2/(4/3)*K*SMTC1 = 3/2*K*SMTC1 | 3*K*SMTC2 = 6*SMTC1 | 3*K*SMTC2 = 6*SMTC1 |
| Collided MG is used by MO2 and MO3 only | 2*K*SMTC1 | 2*K*SMTC2 = 4*K*SMTC1 | 2*K*SMTC2 = 4*K*SMTC1 |

Figure 2:
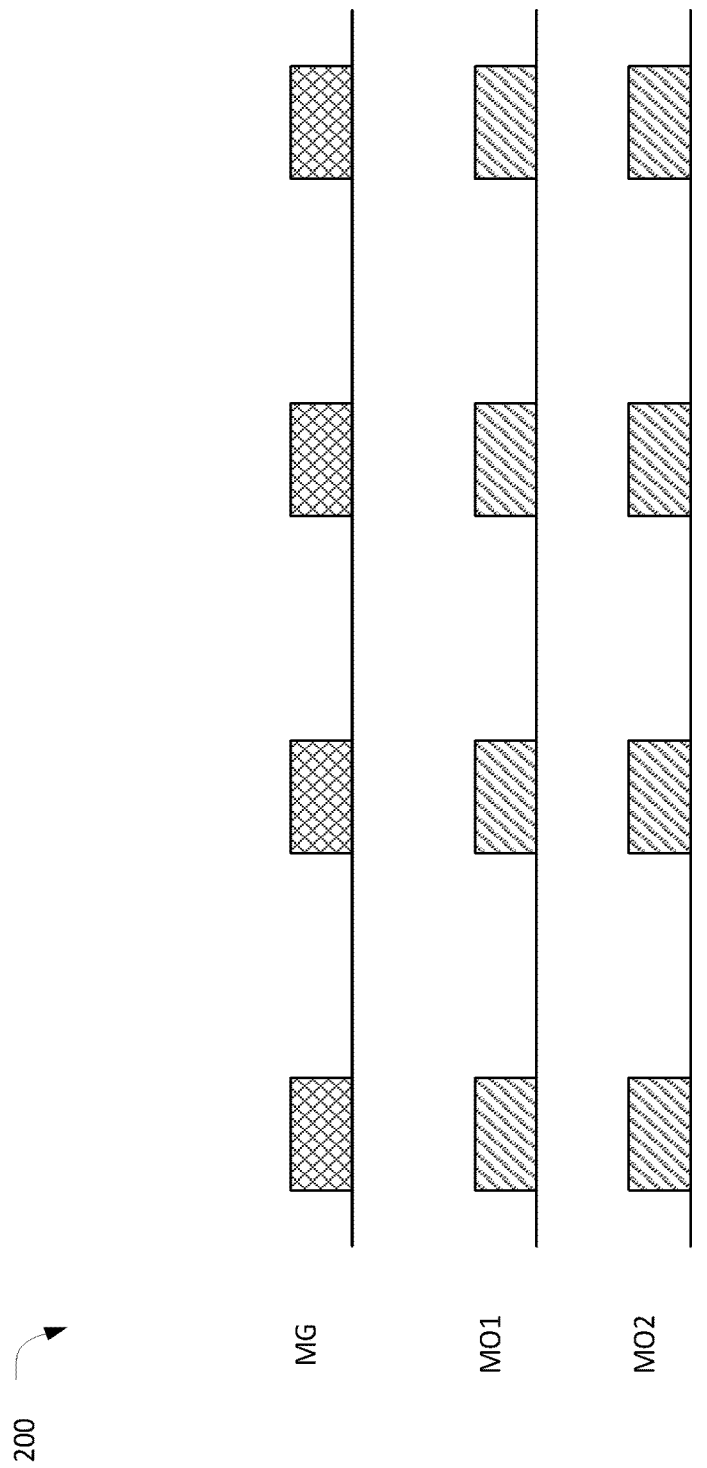
FIG. 2 illustrates a configuration scenario in accordance with some embodiments.
Figure 3:
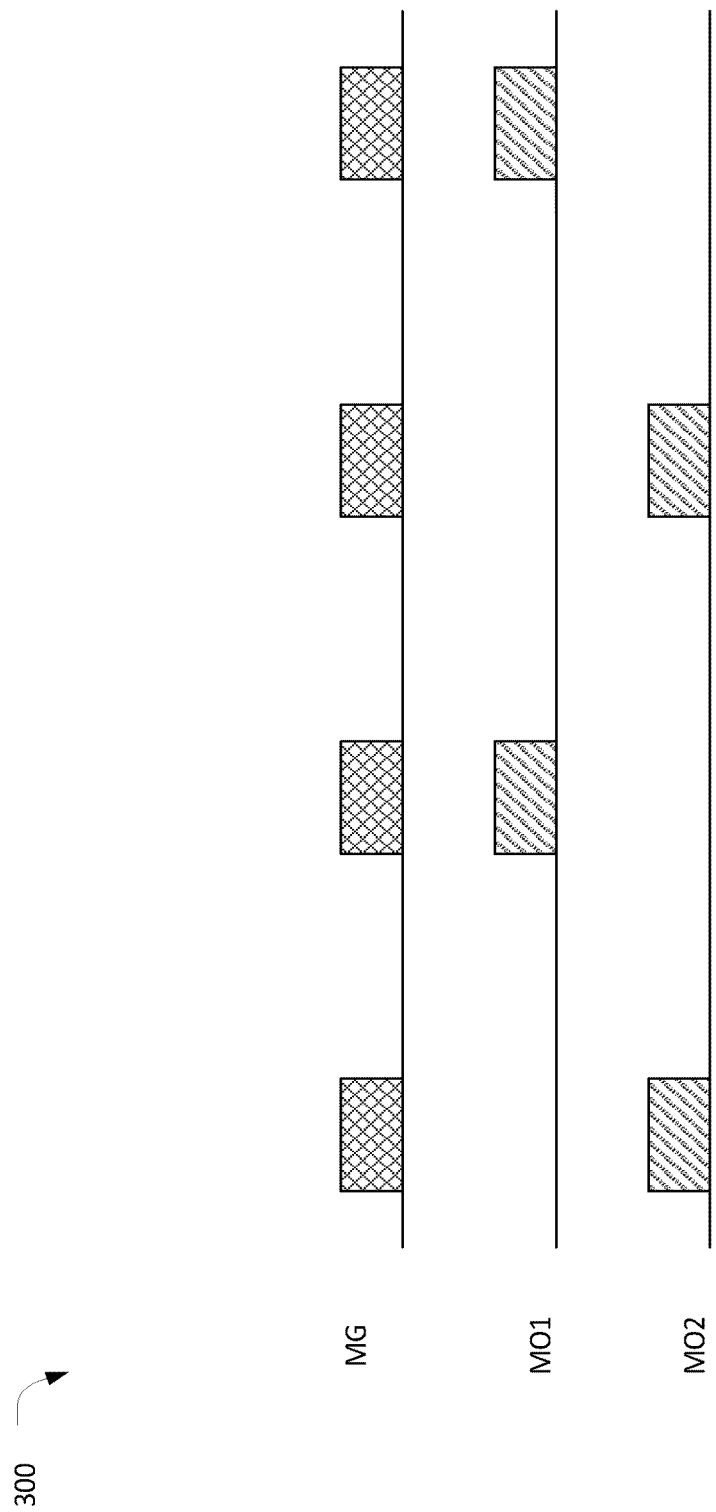
FIG. 3 illustrates a configuration scenario in accordance with some embodiments.
Figure 4:
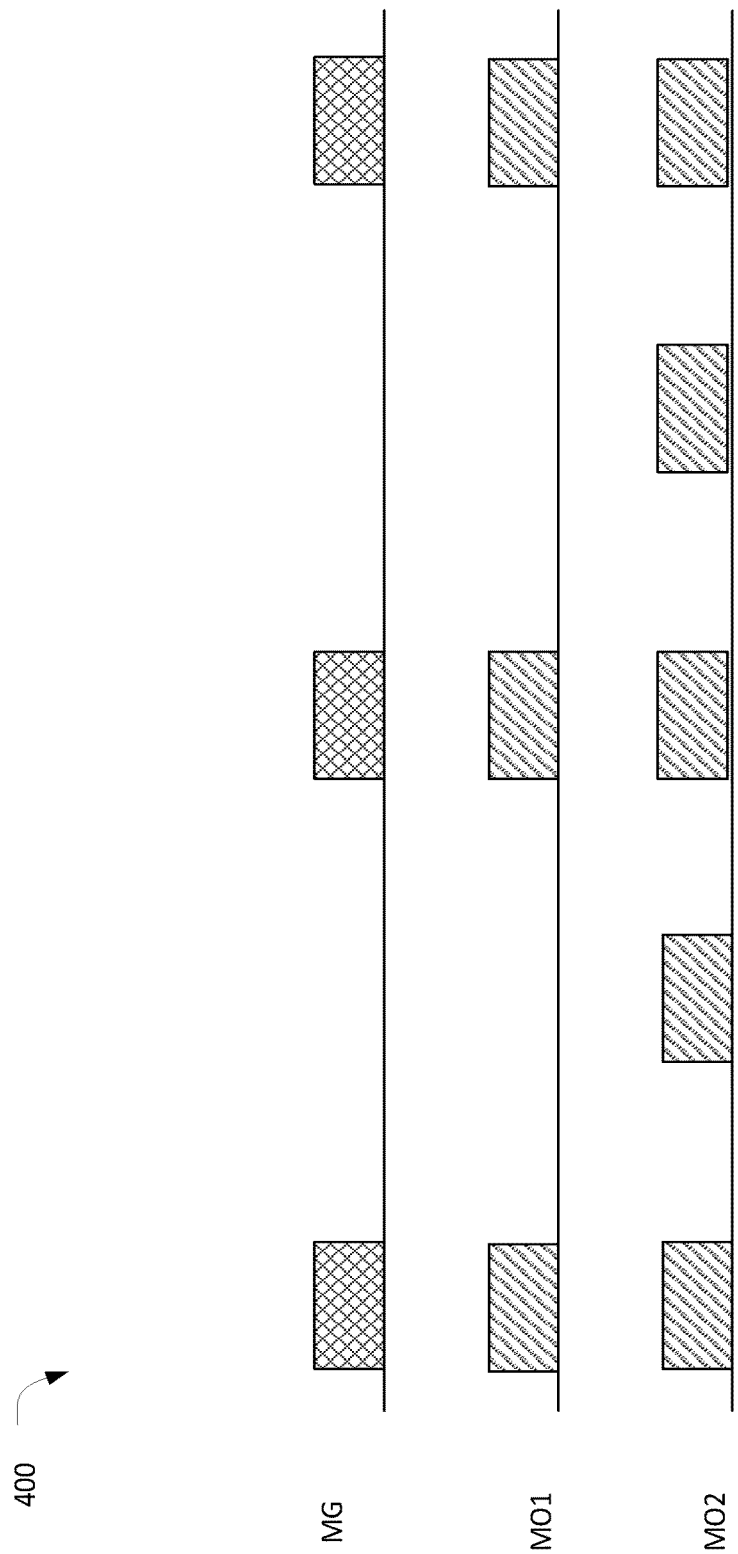
FIG. 4 illustrates a configuration scenario in accordance with some embodiments.

Thus, some embodiments describe restricting scenarios with limited SMTC and MGRP combinations. These embodiments may provide both measurement flexibility and efficiency. FIGS. 2-4 illustrate various configuration scenarios with a MG and a number of MOs. In some embodiments, a particular MO may refer to a group of MOs with similar configurations.

In some embodiments, an access node may configure UEs of a cell such that there are no partially overlapped SMTCs. Consider, for example, scenarios of FIGS. 2 and 3.

FIG. 2 illustrates a configuration scenario 200 in which SMTC occasions of MO1 and MO2 are fully overlapped with the MG and with each other. As shown, the MGRP of the MO may equal the SMTC periodicity of both MO1 and MO2.

FIG. 3 illustrates a configuration scenario 300 in which the SMTC occasions of MO1 and MO2 are fully non-overlapped with one another. As shown, both the SMTC occasions of MO1 and MO2 may be partially overlapped with MG, with each MO overlapped with the MG at a time opposite of the other MO. Further, the SMTC occasions of MO1 may be fully non-overlapped with the SMTC occasions of MO2. As shown, the MGRP of the MO may equal the SMTC periodicity of MO1 of MO.

In both configuration scenario 200 and 300, the MOs may include the same SMTC periodicities, but this may not always be the case.

For configuration scenarios having no partial overlapped SMTC occasions, for example configuration scenarios 200 and 300, all MOs may be grouped based on SMTC configurations. Within a group, all MOs may have fully overlapped SMTC occasions; and SMTC of different groups may be completely non-overlapped.

Various embodiments for this case, may define a per-UE based inter-frequency cell identification requirement or a per-frequency range (FR) based inter-frequency cell identification requirement. The requirement may include a time period, $\tilde{T}_{Identify_{Inter}}$ . . . , that may be a time in which the UE is to identify a target inter-frequency cell. Among other things, it may be depend on whether the target cell is known and on a frequency range of the target cell.

The per-UE based inter-frequency cell identification requirement of an ith group may be defined as:
$\tilde{T}_{Identify\_Inter\_perUEgap,group_i} = K_{Inter-freq,GS}^* (N_{FR1,i} \times M_{Identify_{Inter}-freq,FR1} \times \max(SMTC_i, MGRP) + N_{FR2,i} \times M_{Identify_{Inter}-freq,FR2} \times \max(SMTC_i, MGRP))$ where, $K_{Inter-freq,GS}$ is a scaling factor; SMTCi is an SMTC periodicity of the ith group; NFR1,i is a number of inter-frequency new radio (NR) frequency range 1 (FR1) carriers in the ith group; NFR2 is a number of inter-frequency NR frequency range 2 (FR2) carriers in the ith group; M measurement_Inter-freq, FR1 is a number of SMTCs that are used to measure a cell on an FR1 inter-frequency carrier; and M measurement_Inter-freq, FR2 is a number of syncrhonization signal block (SSBs) that are used to measure a cell on an FR2 inter-frequency carrier.

The per-FR based inter-frequency cell identification requirement for NR FR1 may be defined as
$\tilde{T}_{Identify\_Inter\_perUEgap,FR1} = K_{Inter-freq,GS} \times N_{FR1} \times M_{Identify_{Inter}-freq,FR1} \times SMTC_{FR1}$, where, $K_{Inter-freq,GS}$ is a scaling factor; SMTCFR1 is an SMTC periodicity of NR FR1, which may be configured in an FR1 MO; Mmeasurement_Inter-freq, FR1 is a number of SMTCs that are used to measure a cell on an FR1 inter-frequency carrier; and NFR1 is a number of inter-frequency NR FR1 carriers.

The per-FR based inter-frequency cell identification requirement for NR FR2 may be defined as:
$\tilde{T}_{Indentify\_Inter\_perUEgap,FR2} = K_{Inter-freq,GS} \times N_{FR2} \times M_{Identify_{Inter}-freq,FR2} \times SMTC_{FR2}$, where, $K_{Inter-freq,GS}$ is a scaling factor; SMTCFR2 is an SMTC periodicity of NR FR2, which may be configured in an FR2 MO; Mmeasurement_Inter-freq,FR2 is a number of SMTCs that are used to measure a cell on an FR2 inter-frequency carrier; and NFR2 is a number of inter-frequency NR FR1 carriers.

In some embodiments, an access node may configure UEs of a cell such that there are up to two SMTC periodicities, with one SMTC being fully overlapped with the MG and the other SMTC being partially overlapped with the MG. FIG. 4 illustrates a configuration scenario 400 with such a configuration in accordance with some embodiments.

Some embodiments may consider up to two SMTC periodicities with one fully overlapped with the MG and the other one partially overlapped. This may provede SMTC configuration flexibility at the network side. Limiting embodiments to up to two partially overlapped SMTC configurations per UE for per-UE based configuration and up to two partially overlapped SMTC configurations per FR for FR-based configuration may avoid a complicated scenario having mixed fully overlapped, partially overlapped, and non-overlapped SMTC.

FIG. 4 illustrates a configuration scenario 400 with up to two SMTC periodicities with one fully overlapped with the MG and the other one partially overlapped in accordance with some embodiments. In particular, MO1 is shown having SMTC occasions fully overlapped with the MG and MO2 is shown having SMTC occasions partially overlapped with both the MG and the MO1. In this embodiment, the SMTC periodicity of MO2 may be smaller than the MGRP and the SMTC periodicity of MO1.

The scaling factor of inter-frequency cell identification and measurement delay requirement with per-UE gap can be defined as CSFinter=Ncolliding, where Nco$_{lliding}$ is a number of collided MO with the target MO. With this, and considering three MOs, the corresponding delay becomes:

TABLE 5

|  | MO1 | MO2 | MO3 |
| --- | --- | --- | --- |
| Measurement delay in case 1 | 2*K*SMTC1 | 2*K*SMTC2 = 4*SMTC1 | N/A |
| Measurement delay in case 3 | 3*K*SMTC1 | 3*K*SMTC2 = 6*SMTC1 | 3*K*SMTC2 = 6*SMTC1 |

Embodiments may have the advantage of being simpler and providing more reasonable minimum requirements.

In some embodiments, the scaling factor CSFinter can be defined as a total number of colliding MOs, which may include both partial and full SMTC colliding with a target MO. In case equal sharing is configured for inter-frequency and intra-frequency measurement, the number of collided MOs may include both intra-and inter-frequency MOs. In case non-equal sharing between intra-and inter-frequency measurements is configured, the number of collided MOs may only count the inter-frequency MO. The scaling factor due to gap sharing may be additionally considered.

Figure 5:
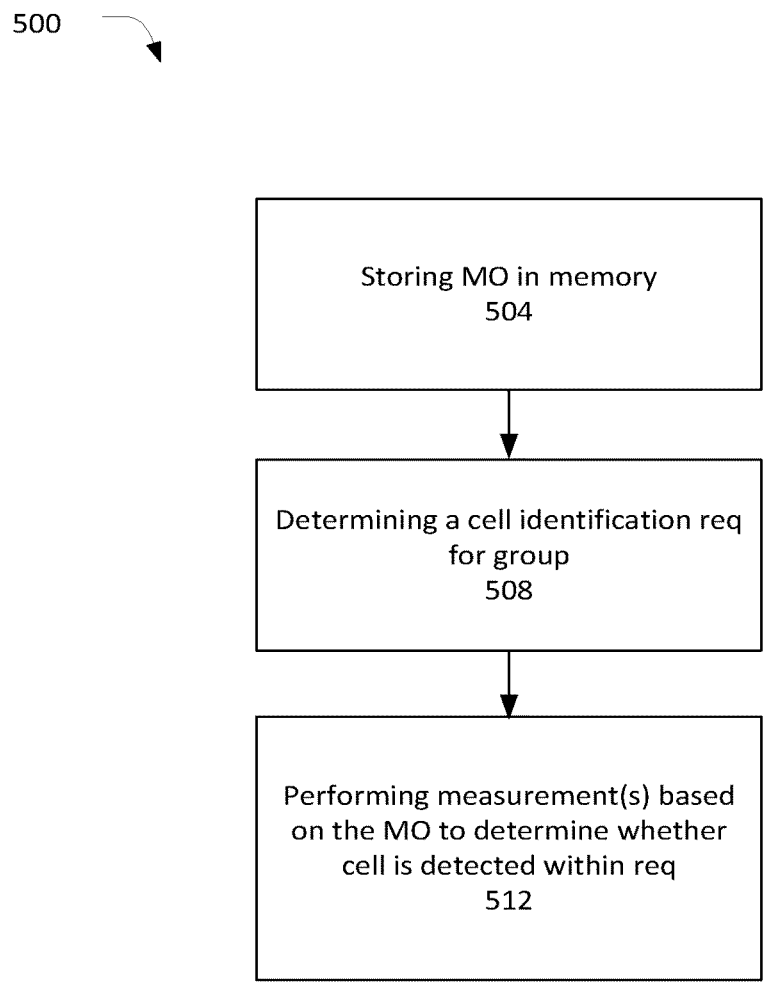
FIG. 5 illustrates an operation flow/algorithmic structure in accordance with some embodiments.

FIG. 5 illustrates an operation flow/algorithmic structure 500 in accordance with some embodiments. In some embodiments, the operation flow/algorithmic structure 500 may be performed or implemented by a UE, for example, UE 104, or components thereof (for example, baseband circuitry) as described herein.

The operation flow/algorithmic structure 500 may include, at 504, storing an MO in memory. The MO may include configuration information such as SMTC information and may be received from an access node in one or more configuration messages, which may be higher-layer signals such as RRC signals. Alternatively, the UE may be preconfigured with the MO information. The MO may be grouped with other MOs based on SMTC configurations of the MOs. The SMTC configurations, or at least certain parts of the SMTC configurations of the MOs within the group may be the same or similar.

The operation flow/algorithmic structure 500 may further include, at 508, determining cell identification requirement(s) for the group. In particular, for example, the UE may determine a cell identification requirement corresponding to a time period in which a cell is to be detected. The cell identification requirements may differ based on circumstances of a particular embodiment. For example, the requirements may depend on whether the measurements are inter- or intra-frequency measurements, performed with or without DRX, etc.

The operation flow/algorithmic structure 500 may further include, at 512, performing measurements based on the MO to determine whether a target cell is detected within the timing requirements. If a cell is detected within the time period provided by the cell identification requirements, the UE may proceed with corresponding measurement reports to the access node.

Figure 6:
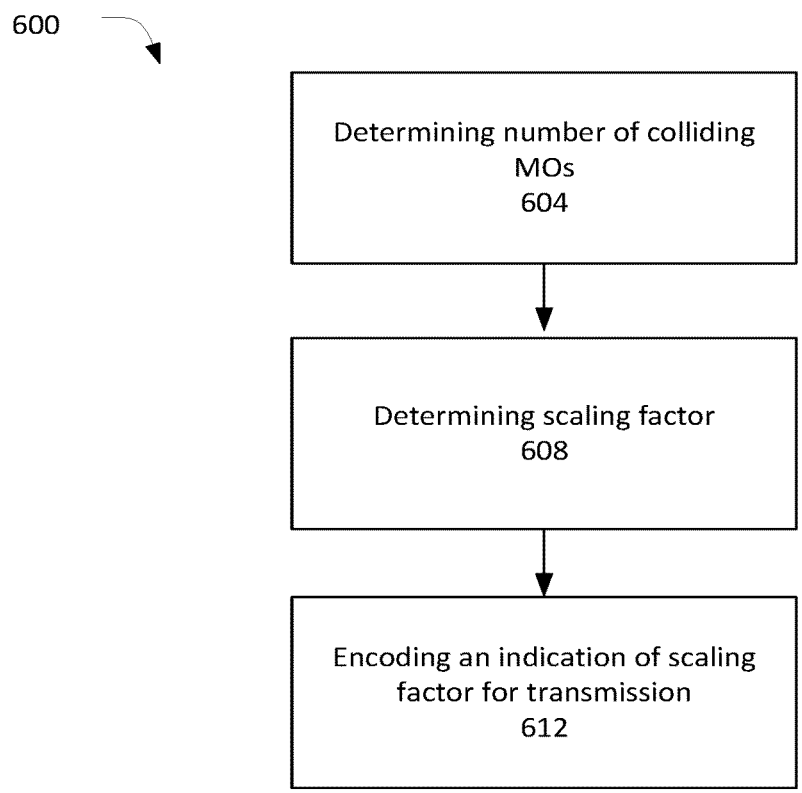
FIG. 6 illustrates an operation flow/algorithmic structure in accordance with some embodiments.

FIG. 6 illustrates an operation flow/algorithmic structure 600 in accordance with some embodiments. The operation flow/algorithmic structure 600 may be performed or implemented by an access node or components thereof (for example, baseband circuitry) as described herein.

The operation flow/algorithmic structure 600 may include, at 604, determining a number of MOs that collide with a target MO. In some embodiments, the colliding MO determination may be based on whether the UE is configured with equal sharing and whether MOs are intra-frequency MOs or inter-frequency MOs. For example, if a UE is configured with equal sharing of collided MOs with other UEs, the access node may determine the number of colliding MOs based on both intra-frequency and inter-frequency MOs. For another example, if a UE is configured with non-equal sharing of collided MOs with other UEs, the access node may determine the number of colliding MOs based on only inter-frequency MOs.

The operation flow/algorithmic structure 600 may further include, at 608, determining a scaling factor. In some embodiments, the scaling factor may be set equal to the number of colliding MOs.

The operation flow/algorithmic structure 600 may further include, at 612, encoding an indication of a scaling factor for transmission. In various embodiments, the indication may be encoded in higher-layer signaling such as RRC signaling or downlink control information (DCI).

Figure 7:
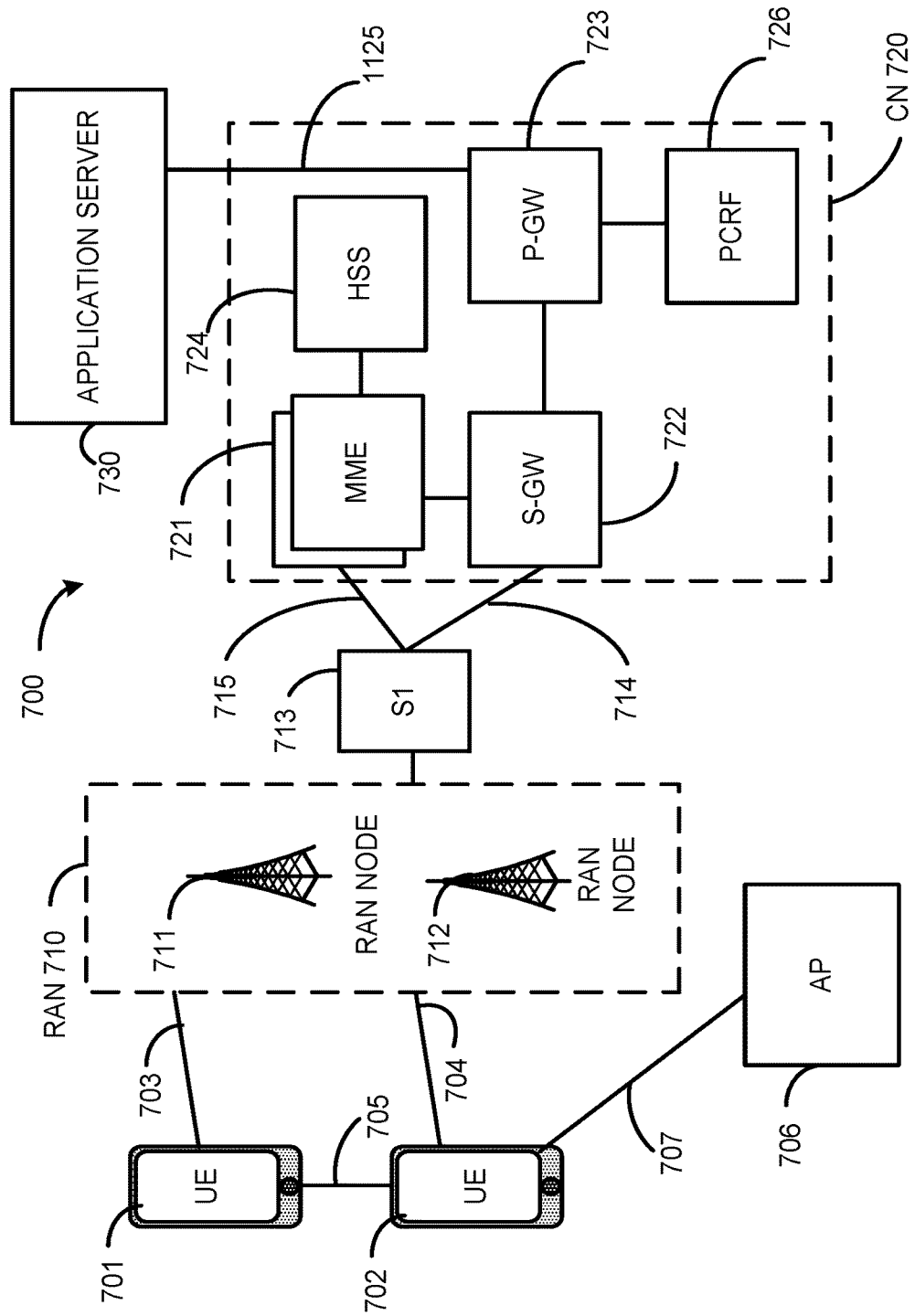
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702, either of which may be similar to and substantially interchangeable with UE 104.

As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 701 and 702 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVT), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 701 and 702 can be configured for efeMTC communication and may, in some instances, comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710. The RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections (or channels) 703 and 704, respectively, to communicate with RAN nodes 711 and 712. The RAN nodes may be similar to and substantially interchangeable with serving access node serving access node 108 or neighbor access node 116.

The connections 703 and 704 may each include a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UNITS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 705 may be used in vehicular applications and communications technologies, which are often referred to as V2X systems. V2X is a mode of communication where UEs (for example, UEs 701, 702) communicate with each other directly over the PC5/SL interface 705 and can take place when the UEs 701, 702 are served by RAN nodes 711, 712 or when one or more UEs are outside a coverage area of the RAN 710. V2X may be classified into four different types: vehicle-to-vehicle (V2V), vehicle to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 701, 702, RAN nodes 711, 712, application servers 730, and pedestrian UEs 701, 702 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 701, 702 may be implemented/employed as Vehicle Embedded Communications Systems (VECS) or vUEs.

The UE 702 is shown to be configured to access an access point (AP) 706 (also referred to as "WLAN node 706", "WLAN 706", "WLAN Termination 706" or "WT 706" or the like) via connection 707. The connection 707 can comprise a local wireless connection, such as a connection consistent with any IEEE 802.7 protocol, wherein the AP 706 would comprise a wireless fidelity (WiFi®) router. In this example, the AP 706 is shown to be connected to the Internet without connecting to the core network of the wireless system (described in further detail below). In various embodiments, the UE 702, RAN 710, and AP 706 may be configured to utilize LTE-WLAN aggregation (LWA) operation and/or WLAN LTE/WLAN Radio Level Integration with IPsec Tunnel (LWIP) operation. The LWA operation may involve the UE 702 in RRC_CONNECTED being configured by a RAN node 711, 712 to utilize radio resources of LTE and WLAN. LWIP operation may involve the UE 702 using WLAN radio resources (e.g., connection 707) via Internet Protocol Security (IPsec) protocol tunneling to authenticate and encrypt packets (e.g., Internet protocol (IP) packets) sent over the connection 707. IPsec tunneling may include encapsulating entirety of original IP packets and adding a new packet header, thereby protecting the original header of the IP packets.

The RAN 710 can include one or more access nodes, e.g., RAN nodes 711, 712, that enable the connections 703 and 704. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 710 may include one or more RAN nodes for providing macrocells and one or more RAN nodes for providing femtocells or picocells (e.g., cells having smaller coverage areas, smaller user capacity, or higher bandwidth compared to macrocells).

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720 via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 710, which is a signaling interface between the RAN nodes 711 and 712 and MIMEs 721.

In this embodiment, the CN 720 comprises the MIMEs 721, the S-GW 722, the Packet Data Network (PDN) Gateway (P-GW) 723, and a home subscriber server (HSS) 724. The MIMEs 721 may be similar in function to the control plane of legacy Serving General Packet Radio Service (GPRS) Support Nodes (SGSN). The MMES 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 720 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Rules Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
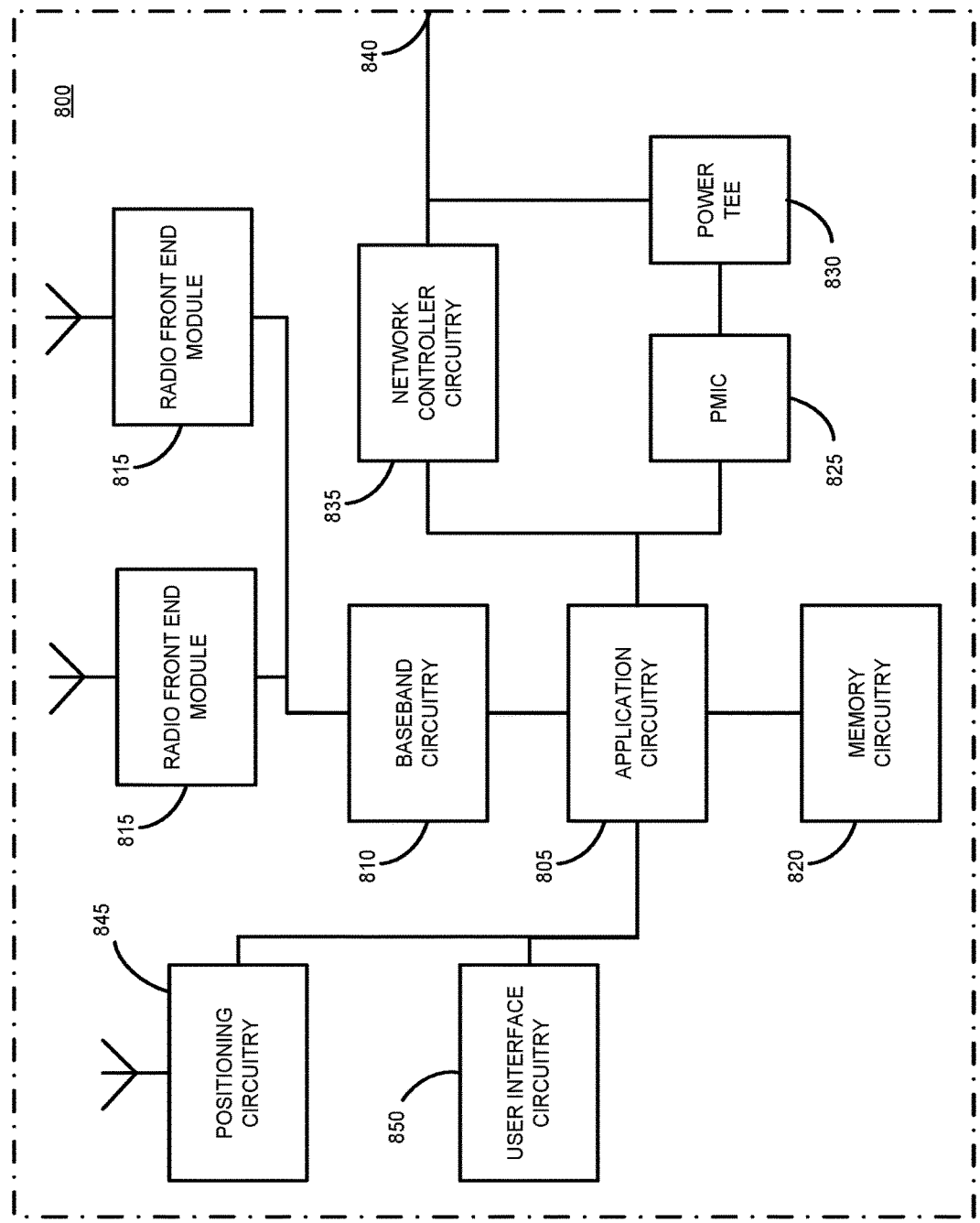
FIG. 8 illustrates an example of an infrastructure equipment in accordance with various embodiments.

FIG. 8 illustrates an example of infrastructure equipment 800 in accordance with various embodiments. The infrastructure equipment 800 (or "system 800") may be implemented as a base station, radio head, RAN node, etc., such as the RAN nodes 711 and 712, and/or AP 706 shown and described previously. In other examples, the system 800 could be implemented in or by a UE, application server(s) 730, and/or any other element/device discussed herein. The system 800 may include one or more of application circuitry 805, baseband circuitry 810, one or more radio front end modules 810, memory 820, power management integrated circuitry (PMIC) 825, power tee circuitry 830, network controller 835, network interface connector 840, satellite positioning circuitry 845, and user interface 850. In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 720 may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 805 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 805 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 800 may not utilize application circuitry 805, and instead may include a special-purpose processor/controller to process IP data received from an EPC or 5GC, for example.

Additionally or alternatively, application circuitry 805 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric including other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. Although not shown, baseband circuitry 810 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (for example, the radio front end modules 810).

User interface circuitry 850 may include one or more user interfaces designed to enable user interaction with the system 800 or peripheral component interfaces designed to enable peripheral component interaction with the system 800. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 810 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 810. The RFEMs 810 may incorporate both millimeter wave antennas and sub-millimeter wave antennas.

The memory circuitry 820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 820 may be implemented as one or more of solder down packaged integrated circuits, socketed memory modules and plug-in memory cards.

The PMIC 825 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 830 may provide for electrical power drawn from a network cable to provide both power supply and data connectivity to the infrastructure equipment 800 using a single cable.

The network controller circuitry 835 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 800 via network interface connector 840 using a physical connection, which may be electrical (commonly referred to as a "copper interconnect"), optical, or wireless. The network controller circuitry 835 may include one or more dedicated processors and/or FPGAs to communicate using one or more of the aforementioned protocol. In some implementations, the network controller circuitry 835 may include multiple controllers to provide connectivity to other networks using the same or different protocols.

The positioning circuitry 845 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 845 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 845 and/or positioning circuitry implemented by UEs 701, 702, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 845 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 845 may provide data to application circuitry 805, which may include one or more of position data or time data. Application circuitry 805 may use the time data to synchronize operations with other radio base stations (e.g., RAN nodes 711, 712, or the like).

The components shown by FIG. 8 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 9:
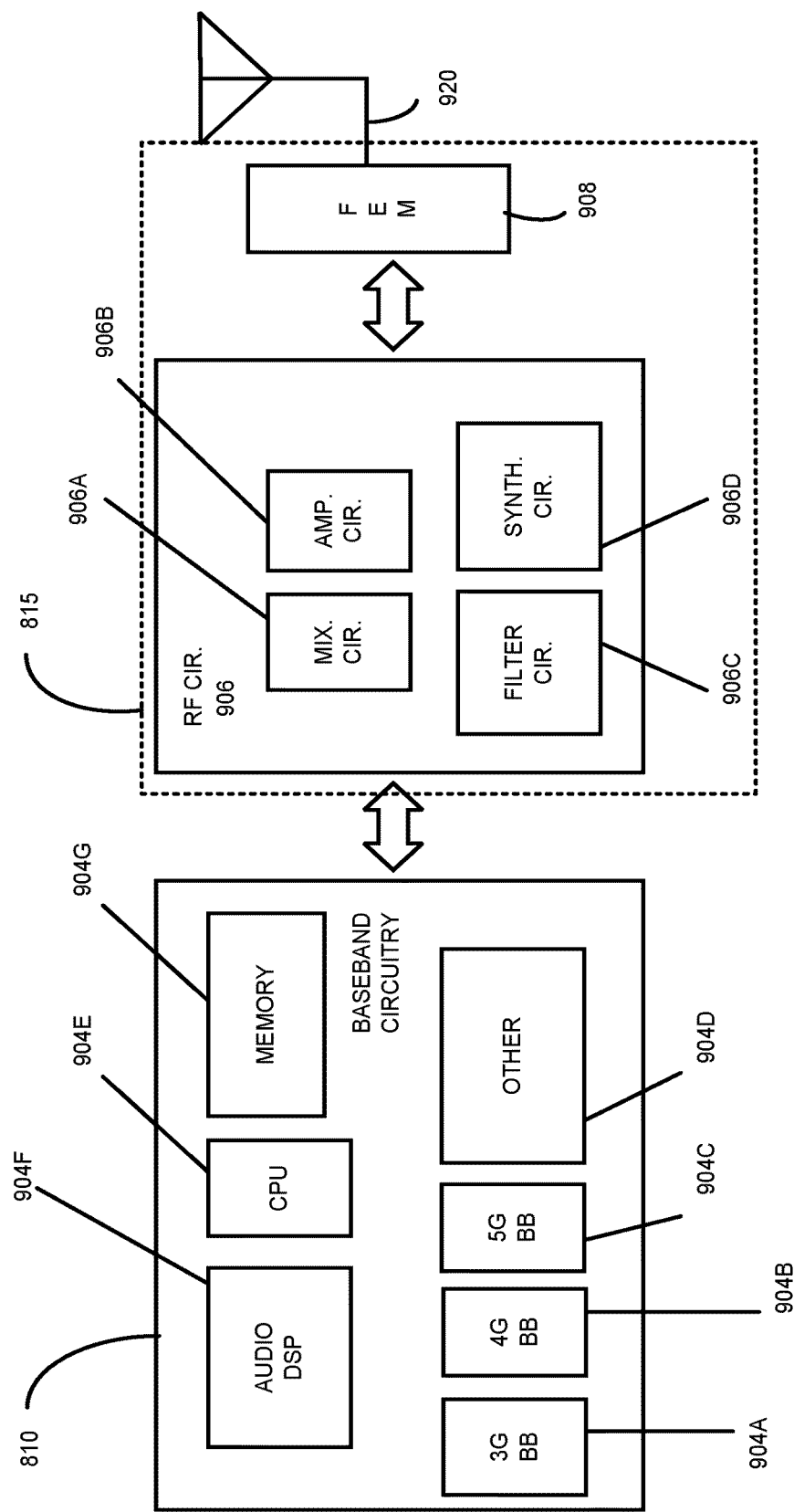
FIG. 9 illustrates example components of baseband circuitry and radio front end modules in accordance with various embodiments.

FIG. 9 illustrates example components of baseband circuitry 810 and radio front end modules (RFEM) 815 in accordance with some embodiments. As shown, the RFEM 815 may include Radio Frequency (RF) circuitry 906, front-end module (FEM) circuitry 908, one or more antennas 90 coupled together at least as shown.

The baseband circuitry 810 may include circuitry such as, but not limited to, one or more single-core or multi-core processors. The baseband circuitry 810 may include one or more baseband processors or control logic to process baseband signals received from a receive signal path of the RF circuitry 906 and to generate baseband signals for a transmit signal path of the RF circuitry 906. Baseband processing circuitry 810 may interface with the application circuitry for generation and processing of the baseband signals and for controlling operations of the RF circuitry 906. For example, in some embodiments, the baseband circuitry 810 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 810 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 810 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 810 and the application circuitry 805/905 may be implemented together such as, for example, on a system on a chip (SoC).

In some embodiments, the baseband circuitry 810 may provide for communication compatible with one or more radio technologies. For example, in some embodiments, the baseband circuitry 810 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 810 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 810. RF circuitry 906 may also include a transmit signal path which may include circuitry to up-convert baseband signals provided by the baseband circuitry 810 and provide RF output signals to the FEM circuitry 908 for transmission.

In some embodiments, the receive signal path of the RF circuitry 906 may include mixer circuitry 906a, amplifier circuitry 906b and filter circuitry 906c. In some embodiments, the transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 810 and may be filtered by filter circuitry 906c.

In some embodiments, the mixer circuitry 906a of the receive signal path and the mixer circuitry 906a of the transmit signal path may include two or more mixers and may be arranged for quadrature downconversion and upconversion, respectively. In some embodiments, the mixer circuitry 906a of the receive signal path and the mixer circuitry 906a of the transmit signal path may include two or more mixers and may be arranged for image rejection (e g , Hartley image rejection). In some embodiments, the mixer circuitry 906a of the receive signal path and the mixer circuitry 906a may be arranged for direct downconversion and direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 810 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 810 or the applications processor depending on the desired output frequency. In some embodiments, a divider control input (e.g., N) may be determined from a look-up table based on a channel indicated by the applications processor 805/905.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 90, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 90. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 90).

Processors of the application circuitry and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the baseband circuitry 810 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
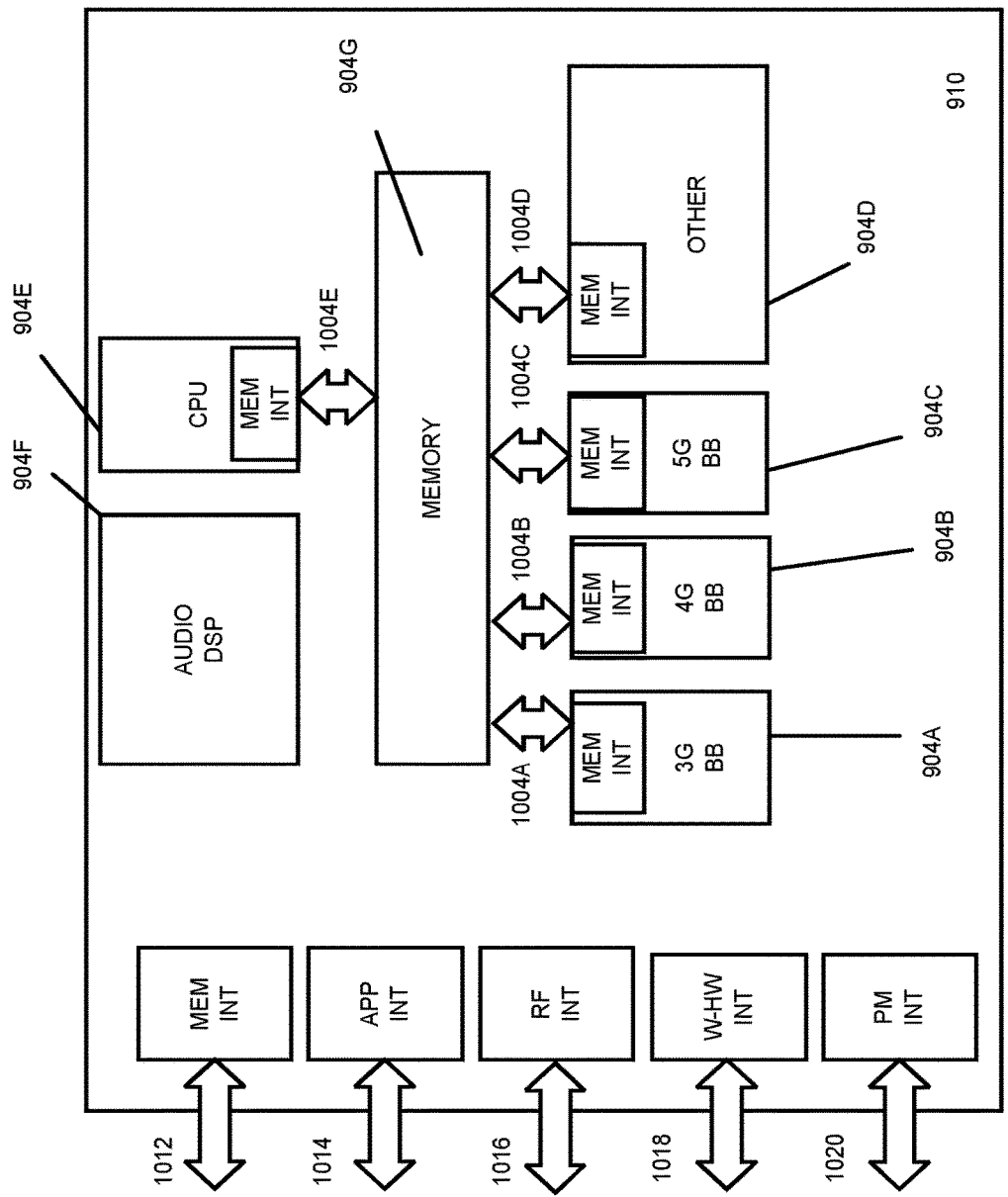
FIG. 10 illustrates example interfaces of baseband circuitry in accordance with various embodiments.

FIG. 10 illustrates example interfaces of baseband circuitry in accordance with some embodiments. As discussed above, the baseband circuitry 810 of FIGS. 8-9 may comprise processors 904A-904E and a memory 904G utilized by said processors. Each of the processors 904A-904E may include a memory interface, 1004A-1004E, respectively, to send/receive data to/from the memory 904G.

The baseband circuitry 810 may further include one or more interfaces to communicatively couple to other circuitries/devices, such as a memory interface 108 (e.g., an interface to send/receive data to/from memory external to the baseband circuitry 810), an application circuitry interface 1014 (e.g., an interface to send/receive data to/from the application circuitry 805 of FIG. 8), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from a PMIC.

Figure 11:
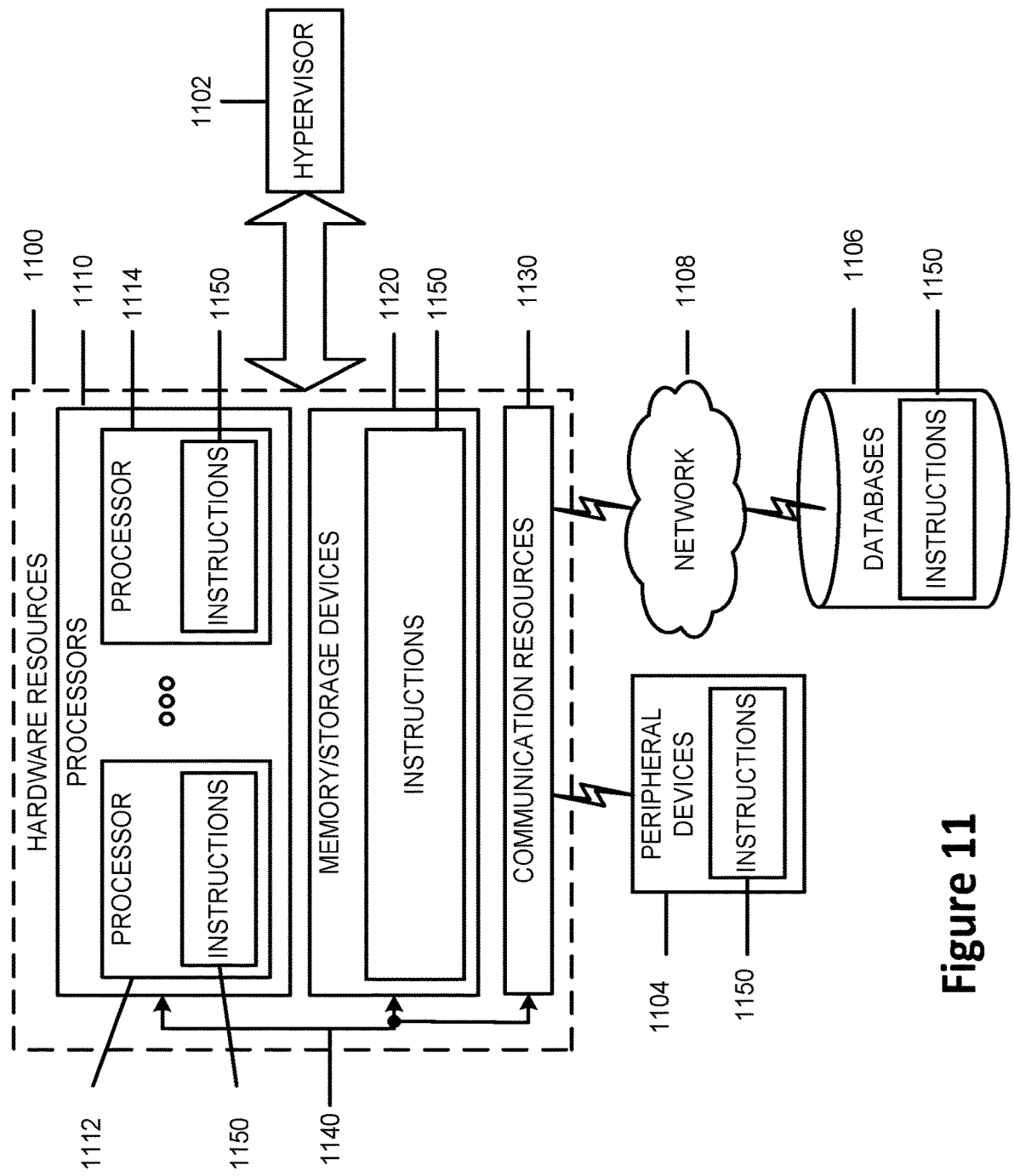
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/sub-slices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 118 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method of operating a UE, the method comprising: storing a measurement object (MO) having an associated SMTC configuration that defines a synchronization-signal block based measurement timing configuration (SMTC) occasion, wherein the MO is within a group of MOs that include SMTC configurations that provide fully overlapped SMTC occasions; determining an inter-frequency cell identification requirement for the group; and performing one or more measurements based on the MO to determine whether a cell is detected within the inter-frequency cell identification requirement.

Example 2 includes the method of example 1 or some other example herein, wherein the MO is a first MO, the group is a first group, and the SMTC occasion is completely non-overlapped with an SMTC occasion associated with a second MO within a second group.

Example 3 includes the method of example 1 or some other example herein, wherein the inter-frequency cell identification requirement is a per-UE based inter-frequency cell identification requirement.

Example 4 includes the method of example 3 or some other example herein, wherein the group is an ith group and the per-UE based inter-frequency cell identification requirement of the ith group is defined as $$\tilde{T}_{Indentify\_Inter\_perUEgap,group_i} = K_{Inter-freq,GS} * (N_{FR1,i} \times M_{Identify_{Inter-freq},FR1} \times \max(SMTC_i, MGRP) + N_{FR2,i} \times M_{Identify_{Inter-freq},FR2} \times \max(SMTC_i, MGRP))$$

where, $K_{Inter-freq,GS}$ is a scaling factor; SMTCi is an SMTC periodicity of the ith group; NFR1,i is a number of inter-frequency new radio (NR) frequency range 1 (FR1) carriers in the ith group; NFR2 is a number of inter-frequency NR frequency range 2 (FR2) carriers in the ith group; M measurement_Inter-freq, FR1 is a number of SMTCs that are used to measure a cell on an FR1 inter-frequency carrier; and M measurement_Inter-freq, FR2 is a number of syncrhonization signal block (SSBs) that are used to measure a cell on an FR2 inter-frequency carrier.

Example 5 includes the method of example 1 or some other example herein, wherein the inter-frequency cell identification requirement is a per-frequency range (FR) based inter-frequency cell identification requirement.

Example 6 includes the method of example 5 or some other example herein, wherein the per-FR based inter-frequency cell identification requirement for new radio (NR) frequency range 1 (FR1) is defined as $$\tilde{T}_{Indentify\_Inter\_perUEgap,FR1} = K_{Inter-freq,GS} \times N_{FR1} \times M_{Identify_{Inter-freq},FR1} \times SMTC_{FR1},$$

where, $K_{Inter-freq,GS}$ is a scaling factor; SMTCFR1 is an SMTC periodicity of NR FR1; Mmeasurement_Inter-freq, FR1 is a number of SMTCs that are used to measure a cell on an FR1 inter-frequency carrier; and NFR1 is a number of inter-frequency NR FR1 carriers.

Example 7 includes the method of example 5 or some other example herein, wherein the per-FR based inter-frequency cell identification requirement for new radio (NR) frequency range 1 (FR2) is defined as $$\tilde{T}_{Indentify\_Inter\_perUEgap,FR2} = K_{Inter-freq,GS} \times N_{FR2} \times M_{Identify_{Inter-freq},FR2} \times SMTC_{FR2},$$

where $K_{Inter-freq,GS}$ is a scaling factor; SMTCFR2 is an SMTC periodicity of NR FR2; Mmeasurement_Inter-freq, FR2 is a number of SMTCs that are used to measure a cell on an FR2 inter-frequency carrier; and NFR2 is a number of inter-frequency NR FR1 carriers.

Example 8 includes a method of operating an access node, the method comprising: determining a number of management objects (MOs) that collide with a target MO for a user equipment (UE); determining, based on the number, a scaling factor to be used for an inter-frequency cell identification requirement; and encoding, for transmission to the UE, an indication of the scaling factor.

Example 9 includes the method of example 8 or some other example herein, wherein to determine the scaling factor the access node is to set the scaling factor equal to the number of MOs that collide with the target MO.

Example 10 includes the method of example 8 or some other example herein, wherein the UE is configured with equal sharing of collided MOs with other UEs and the access node is to determine the number of MOs based on both intra-frequency MOs and inter-frequency MOs.

Example 11 includes the method of example 8 or some other example herein, wherein the UE is configured with non-equal sharing of collided MOs with other UEs and the access node is to determine the number of MOs based only on inter-frequency MOs.

Example 12 includes the method of example 8 or some other example herein, further comprising encoding the indication in a radio resource control signal or downlink control information.

Example 13 includes the method of example 8 or some other example herein, further comprising configuring one or more groups of MOs with synchronization-signal block based measurement timing configuration (SMTC) occasions that are either fully overlapped with one another or are fully non-overlapped with one another.

Example 14 includes the method of example 8 or some other example herein, further comprising: configuring a first MO with a synchronization-signal block based measurement timing configuration (SMTC) occasion that partially overlaps with a measurement group.

Example 15 includes the method of example 14 or some other example herein, wherein the SMTC occasion has a periodicity smaller than a repetition period of the measurement gap.

Example 16 includes a method of operating a UE, the method comprising: obtaining configuration information corresponding to a measurement object (MO) having an associated synchronization-signal block based measurement timing configuration (SMTC) that defines an SMTC occasion, wherein the MO is within a group of MOs that include at least similar SMTCs; determining a time period for inter-frequency cell identification for the group; and performing one or more measurements based on the MO to determine whether a cell is detected within the time period.

Example 17 includes method of example 16 or some other example herein, wherein the MO is a first MO, the group is a first group, and the SMTC occasion is completely non-overlapped with an SMTC occasion associated with a second MO within a second group.

Example 18 includes the method of example 16 or some other example herein, wherein the time period is a per-UE based inter-frequency cell identification requirement.

Example 19 includes the method of example 18 or some other example herein, wherein the group is an ith group and the per-UE based inter-frequency cell identification requirement of the ith group is defined as $$\tilde{T}_{Indentify\_Inter\_perUEgap,group_i} = K_{Inter-freq,GS} * (N_{FR1,i} \times M_{Identify'_{Inter-freq,FR1}} \times \max(SMTC_i, MGRP) + N_{FR2,i} \times M_{Identify'_{Inter-freq,FR2}} \times \max(SMTC_i, MGRP))$$

where, $K_{Inter-freq,GS}$ is a scaling factor; SMTCi is an SMTC periodicity of the ith group; NFR1,i is a number of inter-frequency new radio (NR) frequency range 1 (FR1) carriers in the ith group; NFR2 is a number of inter-frequency NR frequency range 2 (FR2) carriers in the ith group; M measurement_Inter-freq, FR1 is a number of SMTCs that are used to measure a cell on an FR1 inter-frequency carrier; and M measurement_Inter-freq, FR2 is a number of syncrhonization signal block (SSBs) that are used to measure a cell on an FR2 inter-frequency carrier.

Example 20 includes the method of example 16 or some other example herein, wherein time period is a per-frequency range (FR) based inter-frequency cell identification requirement.

Example 21 includes the method of example 20 or some other example herein, wherein the per-FR based inter-frequency cell identification requirement for new radio (NR) frequency range 1 (FR1) is defined as $$\tilde{T}_{Indentify\_Inter\_perUEgap,FR1} = K_{Inter-freq,GS} \times N_{FR1} \times M_{Identify'_{Inter-freq,FR1}} \times SMTC_{FR1},$$

where, $K_{Inter-freq,GS}$ is a scaling factor; SMTCFR1 is an SMTC periodicity of NR FR1; Mmeasurement_Inter-freq, FR1 is a number of SMTCs that are used to measure a cell on an FR1 inter-frequency carrier; and NFR1 is a number of inter-frequency NR FR1 carriers.

Example 22 includes the method of example 20 or some other example herein, wherein the per-FR based inter-frequency cell identification requirement for new radio (NR) frequency range 1 (FR2) is defined as $$\tilde{T}_{Identify\_Inter\_perUEga,FR2} = K_{Inter-freq,GS} \times N_{FR2} \times M_{identify'_{Inter-freq,FR2}} \times SMTC_{FR2},$$

where, $K_{inter-freq,GS}$ is a scaling factor; SMTCFR2 is an SMTC periodicity of NR FR2; Mmeasurement_Inter-freq, FR2 is a number of SMTCs that are used to measure a cell on an FR2 inter-frequency carrier; and NFR2 is a number of inter-frequency NR FR1 carriers.

Example 23 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 24 may include an apparatus comprising logic, modules, or circuitry to perform one or more elements of a method described in or related to any of examples 1-22, or any other method or process described herein.

Example 25 may include a method, technique, or process as described in or related to any of examples 1-22, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-22, or portions thereof.

Example 27 may include a signal as described in or related to any of examples 1-22, or portions or parts thereof.

Example 28 may include a signal in a wireless network as shown and described herein.

Example 29 may include a method of communicating in a wireless network as shown and described herein.

Example 30 may include a system for providing wireless communication as shown and described herein.

Example 31 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An access node comprising:
a transceiver configured to enable wireless communication with a user equipment (UE); and
a processor, communicatively coupled to the transceiver, and configured to:
determine a number of measurement objects (MOs) that collide with a target MO for the UE, wherein the number of MOs is based on both intra-frequency MOs and inter-frequency MOs when the UE is configured with equal sharing of collided MOs with other UEs, and wherein the number of MOs is based only on inter-frequency MOs when the UE is configured with non-equal sharing of collided MOs with other UEs;
determine, based on the number of MOs, a scaling factor to be used for an inter-frequency cell identification requirement; and
encode, for transmission to the UE, an indication of the scaling factor.

2. The access node of claim 1, wherein to determine the scaling factor, the processor is further configured to set the scaling factor equal to the number of MOs that collide with the target MO.

3. The access node of claim 1, wherein the processor is further configured to encode the indication in a radio resource control (RRC) signal or downlink control information (DCI).

4. The access node of claim 1, wherein the processor is further configured to:
configure one or more groups of MOs with synchronization-signal block based measurement timing configuration (SMTC) occasions that are either fully overlapped with one another or are fully non-overlapped with one another.

5. The access node of claim 1, wherein the processor is further configured to:
configure a first MO with a synchronization-signal block based measurement timing configuration (SMTC) occasion that partially overlaps with a measurement gap.

6. The access node of claim 5, wherein the SMTC occasion has a periodicity smaller than a repetition period of the measurement gap.

7. The access node of claim 1, wherein the processor is further configured to:
receive a measurement report from the UE when the UE detects a target cell based on the scaling factor.

8. The access node of claim 1, wherein the indication of the scaling factor is encoded in radio resource control (RRC) signaling or downlink control information (DCI).

9. A non-transitory computer-readable medium (CRM) having instructions that, when executed by one or more processors of an access node, cause the access node to perform operations, the operations comprising:
determining a number of measurement objects (MOs) that collide with a target MO for a user equipment (UE), wherein the number of MOs is based on both intra-frequency MOs and inter-frequency MOs when the UE is configured with equal sharing of collided MOs with other UEs, and wherein the number of MOs is based only on inter-frequency MOs when the UE is configured with non-equal sharing of collided MOs with other UEs;
determining, based on the number of MOs, a scaling factor to be used for an inter-frequency cell identification requirement; and
encoding, for transmission to the UE, an indication of the scaling factor.

10. The non-transitory CRM of claim 9, wherein the determining the scaling factor further comprises setting the scaling factor equal to the number of MOs that collide with the target MO.

11. The non-transitory CRM of claim 9, wherein the operations further comprise encoding the indication in a radio resource control signal (RRC) or downlink control information (DCI).

12. The non-transitory CRM of claim 9, wherein the operations further comprise:
configuring one or more groups of MOs with synchronization-signal block based measurement timing configuration (SMTC) occasions that are either fully overlapped with one another or are fully non-overlapped with one another.

13. The non-transitory CRM of claim 9, wherein the operations further comprise:
configuring a first MO with a synchronization-signal block based measurement timing configuration (SMTC) occasion that partially overlaps with a measurement gap.

14. The non-transitory CRM of claim 13, wherein the SMTC occasion has a periodicity smaller than a repetition period of the measurement gap.

15. The non-transitory CRM of claim 9, wherein the operations further comprises:
receiving a measurement report from the UE when the UE detects a target cell based on the scaling factor.

16. The non-transitory CRM of claim 9, wherein the indication of the scaling factor is encoded in radio resource control (RRC) signaling or downlink control information (DCI).

17. A method of operating an access node comprising:
determining if a UE is configured with equal sharing of collided measurement objects (MOs) with other UEs or with non-equal sharing of collided MOs with other UEs;
in response to determining that the UE is configured with equal sharing of collided MOs with other UEs, determining a number of MOs that collide with a target MO for the UE (UE) based on both intra-frequency MOs and inter-frequency MOs;
in response to determining that the UE is configured with non-equal sharing of collided MOs with other UEs, determining the number of MOs that collide with the target MO for the UE based only on inter-frequency MOs;

determining, based on the number of MOs, a scaling factor to be used for an inter-frequency cell identification requirement; and encoding, for transmission to the UE, an indication of the scaling factor.

18. The method of claim 17, wherein the determining the scaling factor further comprises setting the scaling factor equal to the number of MOs that collide with the target MO.

19. The method of claim 17, further comprising:
receiving a measurement report from the UE when the UE detects a target cell based on the scaling factor.

20. The method of claim 17, wherein the indication of the scaling factor is encoded in radio resource control (RRC) signaling or downlink control information (DCI).

* * * * *